(12) United States Patent
Lai et al.

(10) Patent No.: US 11,704,534 B2
(45) Date of Patent: Jul. 18, 2023

(54) NEURAL-NETWORK-BASED CLASSIFICATION DEVICE AND CLASSIFICATION METHOD

(71) Applicant: Industrial Technology Research Institute, Hsinchu (TW)

(72) Inventors: Ching-Hao Lai, Taichung (TW); Mao-Yu Huang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 1179 days.

(21) Appl. No.: 16/221,612

(22) Filed: Dec. 17, 2018

(65) Prior Publication Data

US 2020/0134393 A1   Apr. 30, 2020

(30) Foreign Application Priority Data

Oct. 29, 2018   (TW) .................................. 107138155

(51) Int. Cl.
*G06F 18/245* (2023.01)
*G06F 18/2113* (2023.01)
*G06N 3/02* (2006.01)
*G06N 3/04* (2023.01)

(52) U.S. Cl.
CPC ........... *G06N 3/02* (2013.01); *G06F 18/2113* (2023.01); *G06F 18/245* (2023.01); *G06N 3/04* (2013.01)

(58) Field of Classification Search
None
See application file for complete search history.

(56) References Cited

U.S. PATENT DOCUMENTS

| 7,089,238 | B1 | 8/2006 | Davis et al. |
| 7,194,380 | B2 | 3/2007 | Barrow et al. |
| 7,296,020 | B2 | 11/2007 | Gerstl et al. |
| 7,593,904 | B1 | 9/2009 | Kirshenbaum et al. |
| 8,495,002 | B2 | 7/2013 | Nelken et al. |
| 8,635,172 | B1 | 1/2014 | Buryak et al. |
| 8,811,727 | B2 | 8/2014 | Mohamed |
| 9,792,359 | B2 | 10/2017 | Kirshenbaum et al. |
| 2009/0060340 | A1* | 3/2009 | Zhou ..................... G06V 20/10 382/190 |

(Continued)

FOREIGN PATENT DOCUMENTS

| CN | 103324937 | 9/2013 |
| CN | 106203523 | 12/2016 |

(Continued)

OTHER PUBLICATIONS

"Office Action of Taiwan Counterpart Application," dated Nov. 4, 2019, p. 1-p. 9.

(Continued)

*Primary Examiner* — Tahmina N Ansari

(74) *Attorney, Agent, or Firm* — JCIPRNET

(57) ABSTRACT

Provided is a neural-network-based classification method, including: generating, by a neural network, one or more score vectors corresponding to one or more samples respectively; determining a first subset of the one or more samples according to the one or more score vectors and a first (Continued)

decision threshold, wherein the first subset is associated with a first class; and selecting samples to be re-examined from the one or more samples according to the first subset.

16 Claims, 11 Drawing Sheets

(56) References Cited

U.S. PATENT DOCUMENTS

| | | | |
|---|---|---|---|
| 2016/0148074 | A1 | 5/2016 | Jean et al. |
| 2018/0268287 | A1* | 9/2018 | Johansen ............. G06K 9/6262 |
| 2019/0378009 | A1* | 12/2019 | Nuzman .................. G06N 3/04 |
| 2020/0134393 | A1* | 4/2020 | Lai .......................... G06N 20/00 |
| 2022/0058273 | A1* | 2/2022 | Rathore ................. G06N 7/005 |

FOREIGN PATENT DOCUMENTS

| | | |
|---|---|---|
| CN | 107451247 | 12/2017 |
| CN | 107463951 | 12/2017 |
| CN | 107607554 | 1/2018 |
| JP | 2014085948 | 5/2014 |
| TW | 201627877 | 8/2016 |
| TW | I553494 | 10/2016 |
| TW | 201824100 | 7/2018 |

OTHER PUBLICATIONS

Jeon et al. "Automatic image annotation and retrieval using cross-media relevance models," Proceedings of the 26th annual international ACM SIGIR conference on Research and development in informaion retrieval. ACM, Jul. 28-Aug. 1, 2003, pp. 1-8.

Reeve et al., "Survey of semantic annotation platforms," Proceedings of the 2005 ACM symposium on Applied computing. ACM, Mar. 13-17, 2005, pp. 1-6.

Duchenne et al., "Automatic annotation of human actions in video," 2009 IEEE 12th International Conference on Computer Vision , Sep. 29-Oct. 2, 2009, pp. 1-8.

Linder et al., "A malaria diagnostic tool based on computer vision screening and visualization of Plasmodium falciparum candidate areas in digitized blood smears," PLOS One, vol. 9, issue 8, Aug. 2014, pp. 1-12.

Saito et al., "The precision-recall plot is more informative than the ROC plot when evaluating binary classifiers on imbalanced datasets, " PLOS One, vol. 10, issue 3, Mar. 2015, pp. 1-21.

"Office Action of Taiwan Counterpart Application", dated Jun. 23, 2020, p. 1-p. 6.

"Office Action of China Counterpart Application", dated May 9, 2023, pp. 1-7.

\* cited by examiner

FIG. 5A

Validation set of Table 1 (Neural network model used: DFB-Net)

| Overall accuracy (%) | Overall error (%) | | Class 1 | Class 2 | Class 3 | Class 4 | Class 5 | Class 6 | Class 7 | Rate of samples not requiring human inspection (%) | Total of samples not requiring human inspection | Total of sample |
|---|---|---|---|---|---|---|---|---|---|---|---|---|
| 97.152 | 2.848 | | | | | Prediction results of Neural network | | | | | | |
| | | Class 1 | 1338 | 0 | 0 | 0 | 0 | 0 | 0 | 76.19 | 4468 | 1338 |
| | Ground truth | Class 2 | 11 | 859 | 1 | 1 | 1 | 1 | 0 | | | 974 |
| | | Class 3 | 6 | 6 | 1043 | 6 | 3 | 0 | 0 | | | 1064 |
| | | Class 4 | 16 | 7 | 7 | 674 | 9 | 23 | 0 | | | 736 |
| | | Class 5 | 11 | 1 | 1 | 6 | 1192 | 2 | 1 | | | 1214 |
| | | Class 6 | 12 | 2 | 3 | 19 | 8 | 270 | 0 | | | 314 |
| | | Class 7 | 2 | 0 | 0 | 0 | 0 | 1 | 221 | | | 224 |
| | | Sum-up | 1396 | 975 | 1055 | 706 | 1213 | 297 | 222 | | | 5864 |

FIG. 5B

Validation set of Table 1 (Neural network model used: DFB-Net)

| Overall accuracy (%) | Overall error (%) | | Class 1 | Class 2 | Class 3 | Class 4 | Class 5 | Class 6 | Class 7 | Rate of samples not requiring human inspection (%) | Total of samples not requiring human inspection | Total of samples |
|---|---|---|---|---|---|---|---|---|---|---|---|---|
| 97.408 | 2.592 | | | | | Prediction results of Neural network | | | | | | |
| | | Class 1 | 1298 | 17 | 2 | 0 | 15 | 6 | 0 | 22.14 | 1298 | 1338 |
| | Ground truth | Class 2 | 0 | 967 | 0 | 3 | 2 | 2 | 0 | | | 974 |
| | | Class 3 | 0 | 3 | 1050 | 7 | 4 | 0 | 0 | | | 1064 |
| | | Class 4 | 0 | 5 | 8 | 687 | 6 | 30 | 0 | | | 736 |
| | | Class 5 | 0 | 1 | 0 | 5 | 1202 | 5 | 1 | | | 1214 |
| | | Class 6 | 0 | 0 | 1 | 19 | 9 | 285 | 0 | | | 314 |
| | | Class 7 | 0 | 0 | 0 | 0 | 0 | 1 | 223 | | | 224 |
| | | Sum-up | 1298 | 993 | 1061 | 721 | 1238 | 329 | 224 | | | 5864 |

FIG. 5C

Testing set of Table 1 (Neural network model used: DFB-Net)

| Overall accuracy (%) | Overall error (%) | | | | | | | | | Prediction results of Neural network | | |
|---|---|---|---|---|---|---|---|---|---|---|---|---|
| 97.374 | 2.626 | | Class 1 | Class 2 | Class 3 | Class 4 | Class 5 | Class 6 | Class 7 | Rate of samples not requiring human inspection (%) | Total of samples not requiring human inspection | Total of samples |
| | | Ground truth | | | | | | | | | | |
| | | Class 1 | 1328 | 0 | 0 | 0 | 1 | 0 | 0 | 76.45 | 4483 | 1329 |
| | | Class 2 | 13 | 1018 | 1 | 1 | 2 | 1 | 0 | | | 1036 |
| | | Class 3 | 5 | 4 | 1049 | 6 | 2 | 0 | 0 | | | 1066 |
| | | Class 4 | 14 | 3 | 7 | 684 | 6 | 29 | 0 | | | 743 |
| | | Class 5 | 10 | 1 | 0 | 2 | 1160 | 8 | 0 | | | 1181 |
| | | Class 6 | 11 | 0 | 2 | 13 | 11 | 276 | 0 | | | 313 |
| | | Class 7 | 0 | 0 | 0 | 0 | 1 | 0 | 195 | | | 196 |
| | | Sum-up | 1381 | 1026 | 1059 | 706 | 1183 | 314 | 195 | | | 5864 |

FIG. 5D

Testing set of Table 1 (Neural network model used: DFB-Net)

| Overall accuracy (%) | Overall error (%) | | | | | | | | | Prediction results of Neural network | | |
|---|---|---|---|---|---|---|---|---|---|---|---|---|
| 97.340 | 2.660 | | Class 1 | Class 2 | Class 3 | Class 4 | Class 5 | Class 6 | Class 7 | Rate of samples not requiring human inspection (%) | Total of samples not requiring human inspection | Total of samples |
| | | Ground truth | | | | | | | | | | |
| | | Class 1 | 1283 | 16 | 2 | 2 | 12 | 13 | 1 | 21.88 | 1283 | 1329 |
| | | Class 2 | 0 | 1024 | 1 | 6 | 4 | 1 | 0 | | | 1036 |
| | | Class 3 | 0 | 3 | 1056 | 5 | 2 | 0 | 0 | | | 1066 |
| | | Class 4 | 0 | 3 | 8 | 697 | 3 | 32 | 0 | | | 743 |
| | | Class 5 | 0 | 1 | 1 | 4 | 1168 | 7 | 0 | | | 1181 |
| | | Class 6 | 0 | 0 | 0 | 16 | 12 | 285 | 0 | | | 313 |
| | | Class 7 | 0 | 0 | 0 | 0 | 1 | 0 | 195 | | | 196 |
| | | Sum-up | 1283 | 1047 | 1068 | 730 | 1202 | 338 | 196 | | | 5864 |

FIG. 6A

Validation set of Table 1 (Neural network model used: DFB-Net)

| Overall accuracy (%) | Overall error (%) | | Prediction results of Neural network | | | | | | | Rate of samples not requiring human inspection (%) | Total of samples not requiring human inspection | Total of samples |
|---|---|---|---|---|---|---|---|---|---|---|---|---|
| | | | Class 1 | Class 2 | Class 3 | Class 4 | Class 5 | Class 6 | Class 7 | | | |
| 96.419 | 3.581 | | | | | | | | | 81.39 | 4773 | |
| | | Class 1 | 1324 | 14 | 0 | 0 | 0 | 0 | 0 | | | 1338 |
| | | Class 2 | 0 | 974 | 0 | 0 | 0 | 0 | 0 | | | 974 |
| | Ground truth | Class 3 | 0 | 25 | 1032 | 4 | 3 | 0 | 0 | | | 1064 |
| | | Class 4 | 1 | 31 | 7 | 665 | 7 | 25 | 0 | | | 736 |
| | | Class 5 | 3 | 33 | 0 | 4 | 1170 | 3 | 1 | | | 1214 |
| | | Class 6 | 0 | 14 | 3 | 24 | 7 | 266 | 0 | | | 314 |
| | | Class 7 | 0 | 0 | 0 | 0 | 0 | 1 | 223 | | | 224 |
| | Sum-up | | 1328 | 1091 | 1042 | 697 | 1187 | 295 | 224 | | | 5864 |

FIG. 6B

Validation set of Table 1 (Neural network model used: DFB-Net)

| Overall accuracy (%) | Overall error (%) | | Prediction results of Neural network | | | | | | | Rate of samples not requiring human inspection (%) | Total of samples not requiring human inspection | Total of samples |
|---|---|---|---|---|---|---|---|---|---|---|---|---|
| | | | Class 1 | Class 2 | Class 3 | Class 4 | Class 5 | Class 6 | Class 7 | | | |
| 95.907 | 4.093 | | | | | | | | | 14.22 | 834 | |
| | | Class 1 | 1336 | 0 | 0 | 0 | 2 | 0 | 0 | | | 1338 |
| | | Class 2 | 12 | 834 | 33 | 20 | 61 | 14 | 0 | | | 974 |
| | Ground truth | Class 3 | 0 | 0 | 1051 | 8 | 4 | 1 | 0 | | | 1064 |
| | | Class 4 | 1 | 0 | 9 | 691 | 6 | 29 | 0 | | | 736 |
| | | Class 5 | 2 | 0 | 2 | 5 | 1199 | 5 | 1 | | | 1214 |
| | | Class 6 | 1 | 0 | 1 | 14 | 8 | 290 | 0 | | | 314 |
| | | Class 7 | 0 | 0 | 0 | 0 | 0 | 1 | 223 | | | 224 |
| | Sum-up | | 1352 | 834 | 1096 | 738 | 1280 | 340 | 224 | | | 5864 |

FIG. 6C

Testing set of Table 1 (Neural network model used: DFB-Net)

| Overall accuracy (%) | Overall error (%) | | Prediction results of Neural network | | | | | | | Rate of samples not requiring human inspection (%) | Total of samples not requiring human inspection | Total of samples |
|---|---|---|---|---|---|---|---|---|---|---|---|---|
| | | | Class 1 | Class 2 | Class 3 | Class 4 | Class 5 | Class 6 | Class 7 | | | |
| 96.606 | 3.394 | Class 1 | 1316 | 12 | 0 | 0 | 1 | 0 | 0 | 80.49 | 4720 | 1329 |
| | | Class 2 | 0 | 1036 | 0 | 0 | 0 | 0 | 0 | | | 1036 |
| | | Class 3 | 0 | 27 | 1032 | 5 | 1 | 1 | 0 | | | 1066 |
| | Ground truth | Class 4 | 1 | 32 | 6 | 670 | 4 | 30 | 0 | | | 743 |
| | | Class 5 | 1 | 31 | 0 | 2 | 1141 | 6 | 0 | | | 1181 |
| | | Class 6 | 0 | 6 | 1 | 15 | 16 | 275 | 0 | | | 313 |
| | | Class 7 | 0 | 0 | 0 | 0 | 1 | 0 | 195 | | | 196 |
| | | Sum-up | 1318 | 1144 | 1039 | 692 | 1164 | 312 | 195 | | | 5864 |

FIG. 6D

Testing set of Table 1 (Neural network model used: DFB-Net)

| Overall accuracy (%) | Overall error (%) | | Prediction results of Neural network | | | | | | | Rate of samples not requiring human inspection (%) | Total of samples not requiring human inspection | Total of samples |
|---|---|---|---|---|---|---|---|---|---|---|---|---|
| | | | Class 1 | Class 2 | Class 3 | Class 4 | Class 5 | Class 6 | Class 7 | | | |
| 95.310 | 4.690 | Class 1 | 1327 | 0 | 0 | 0 | 1 | 1 | 0 | 14.67 | 860 | 1329 |
| | | Class 2 | 12 | 859 | 38 | 38 | 71 | 18 | 0 | | | 1036 |
| | | Class 3 | 0 | 1 | 1058 | 5 | 2 | 0 | 0 | | | 1066 |
| | Ground truth | Class 4 | 1 | 0 | 9 | 696 | 3 | 34 | 0 | | | 743 |
| | | Class 5 | 1 | 0 | 1 | 7 | 1166 | 6 | 0 | | | 1181 |
| | | Class 6 | 1 | 0 | 0 | 13 | 11 | 288 | 0 | | | 313 |
| | | Class 7 | 0 | 0 | 0 | 0 | 1 | 0 | 195 | | | 196 |
| | | Sum-up | 1342 | 860 | 1106 | 759 | 1255 | 347 | 195 | | | 5864 |

US 11,704,534 B2

NEURAL-NETWORK-BASED CLASSIFICATION DEVICE AND CLASSIFICATION METHOD

CROSS-REFERENCE TO RELATED APPLICATION

This application claims the priority benefit of Taiwan application no. 107138155, filed on Oct. 29, 2018. The entirety of the above-mentioned patent application is hereby incorporated by reference herein and made a part of this specification.

TECHNICAL FIELD

The disclosure relates to neural-network-based classification device and classification method.

BACKGROUND

In the industrial manufacturing industry (e.g., the semiconductor industry), an image recognition technology is often used to select defective items to control a shipment quality for the product. For example, a recognition model trained by machine learning is usually used to inspect defective items in the industry. However, the existing inspection schemes often have problems of insufficient accuracy (or overly-high overkill rate) in defect classification and being unable to recognize important defect classes.

Therefore, the industrial manufacturing industry still cannot rely entirely on the image recognition technology to inspect product defects, and the existing image recognition technology mostly aims to improve overall prediction accuracy. In order to prevent defective items from entering the market, human inspection is required to re-examine the product. Nonetheless, due to a massive production of the product, a production quality can be inadequate since the factory usually needs to consume a large amount of human resources, and yet human inspection can only be used in a random sampling manner instead of a comprehensive manner for the product.

To solve the above problems, it is necessary to propose a classification method that can effectively reduce the cost of human resources and can improve the classification for important defect classes.

SUMMARY

The disclosure provides a neural-network-based classification device, which includes a storage medium and a processor. The storage medium stores a plurality of modules. The processor is coupled to the storage medium, accesses and executes the modules of the storage medium. The modules include a neural network, a classifier and a computation module. The neural network generates one or more score vectors corresponding to one or more samples respectively. The classifier determines a first subset of the one or more samples according to the one or more score vectors and a first decision threshold. The first subset is associated with a first class. The computation module selects samples to be re-examined from the one or more samples according to the first subset.

The disclosure provides a neural-network-based classification method, including: generating, by a neural network, one or more score vectors corresponding to one or more samples respectively; determining a first subset of the one or more samples according to the one or more score vectors and a first decision threshold, wherein the first subset is associated with a first class; selecting samples to be re-examined from the one or more samples according to the first subset.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 5A, 5B, 5C and 5D are schematic diagrams illustrating experiment results of a method 400 according to the embodiments of the disclosure.

FIGS. 6A, 6B, 6C and 6D are schematic diagrams illustrating experiment results of the method 400 according to the embodiments of the disclosure.

DETAILED DESCRIPTION

Figure 1:
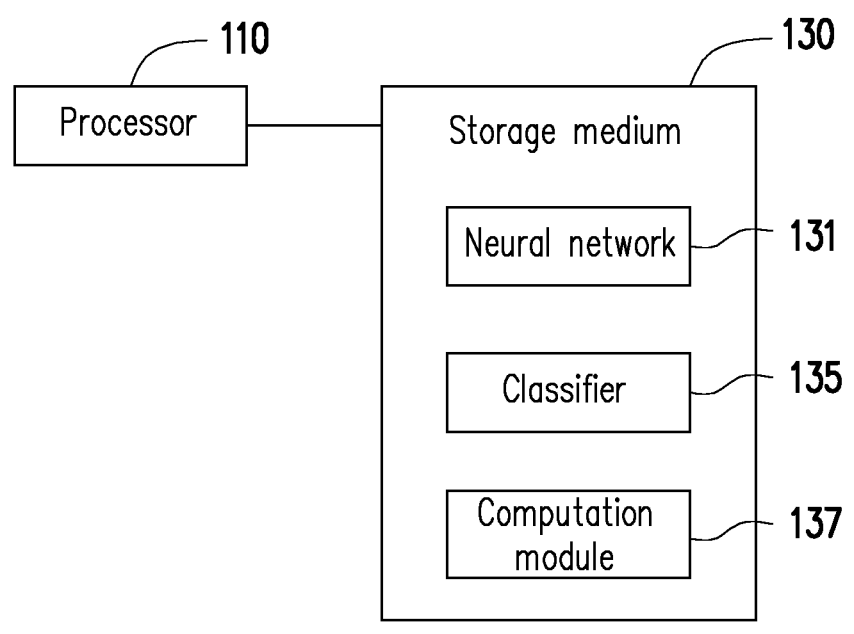
FIG. 1 is a schematic diagram illustrating a neural-network-based classification device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

During the industrial manufacturing process, solutions based on neural networks (or other techniques in the field of artificial intelligence) are often used to classify samples with defects. However, the existing neural-network is unable to achieve 100% overall accuracy. Thus, human inspection is still required to re-examine the product. In order to reduce a total of samples to be re-examined and reduce labor costs, the disclosure proposes neural-network-based classification device and classification method.

FIG. 1 is a schematic diagram illustrating a neural-network-based classification device 10 according to the first embodiment of the disclosure. The classification device 10 may include a processor 110 and a storage medium 130. Here, the storage medium 130 stores a plurality of modules including a neural network 131, a classifier 135 and a computation module 137, and functions of those modules will be described in this disclosure. Those skilled in the art should understand that the neural network 131, the classifier 135 and the computation module 137 in the disclosure may also be implemented in from of hardware circuits rather than in form of the modules stored in the storage medium 130. The disclosure is not limited in this regard. The classification device 10 is applicable to classify visual defects for a wafer or a printed circuit board, but the disclosure is not limited thereto.

The processor 110 is coupled to the storage medium 130 and is able to access or execute the modules stored in the storage medium 130. The processor 110 may be, for example, a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements. The disclosure is not limited in this regard.

The storage medium 130 is configured to store various software, data and various program codes required for running the classification device 10. The storage medium 130 may be, for example, a random access memory (RAM), a read-only memory (ROM), a flash memory, a hard Disk drive (HDD), a hard disk drive (HDD) as a solid state drive (SSD) or other similar devices in any stationary or movable form, or a combination of the above-mentioned devices. The disclosure is not limited in this regard.

Figure 2A:
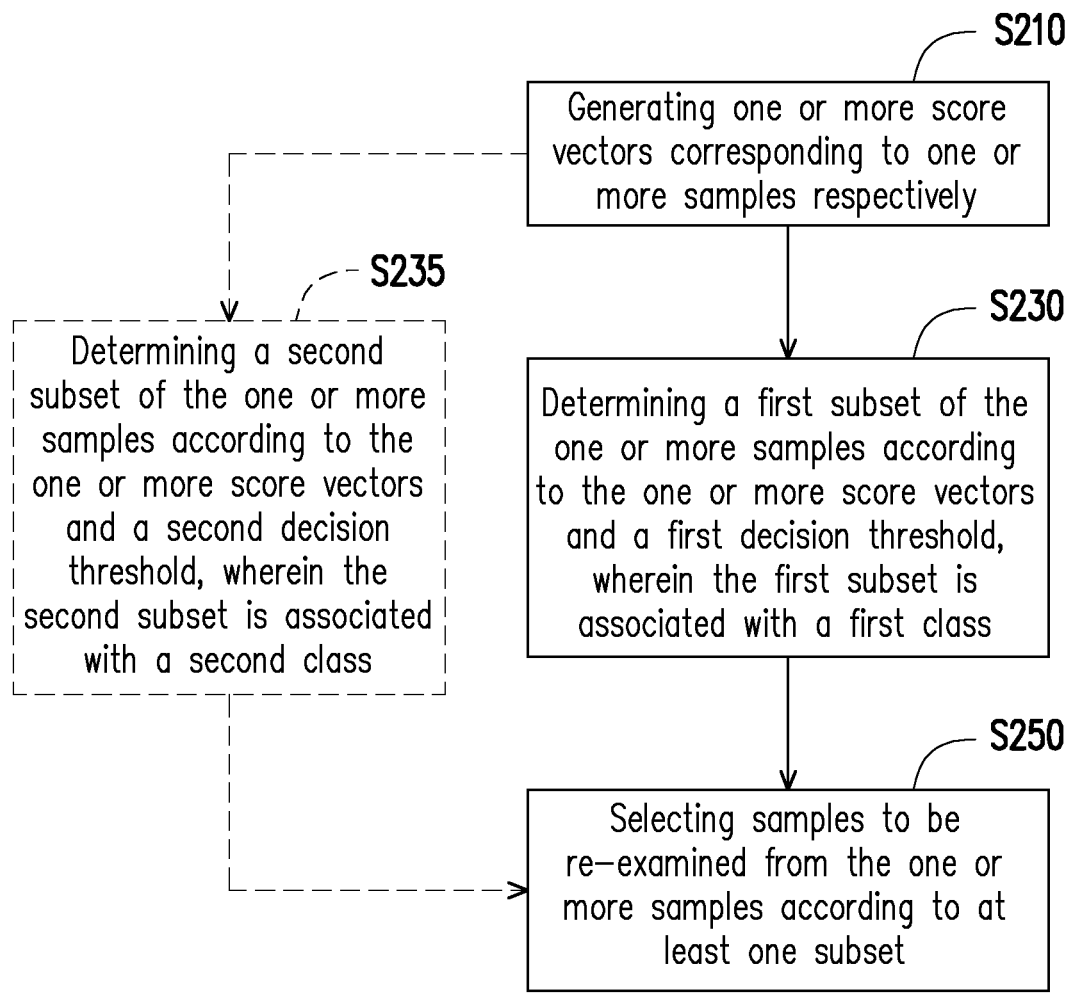
FIG. 2A is a flowchart illustrating a neural-network-based classification method according to a second embodiment of the disclosure.
Figure 2B:
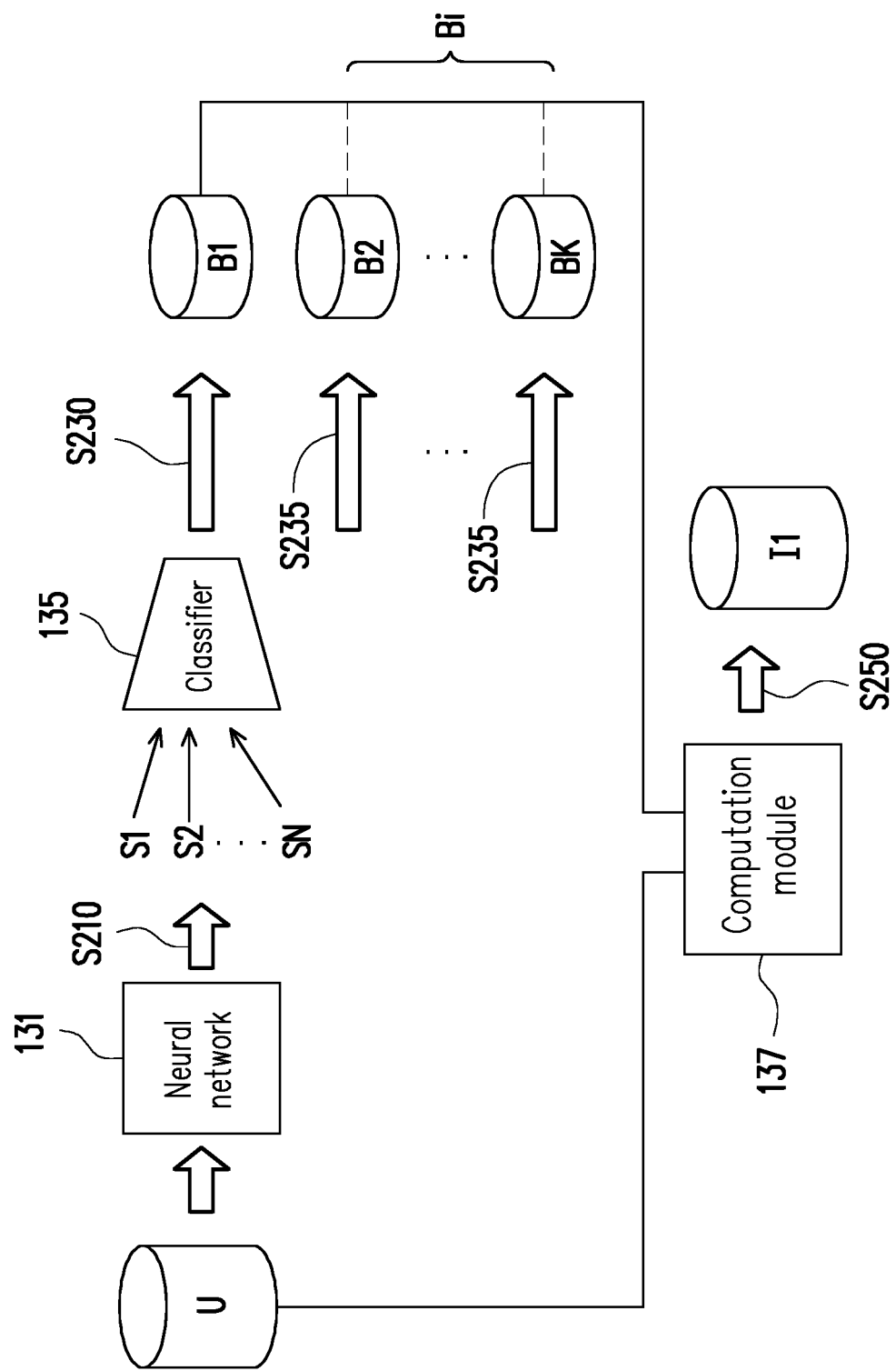
FIG. 2B is a schematic diagram illustrating flows in the neural-network-based classification method according to the second embodiment of the disclosure.

FIG. 2A is a flowchart illustrating a neural-network-based classification method 200 according to the second embodiment of the disclosure, and FIG. 2B is a schematic diagram illustrating flows in the neural-network-based classification method 200 according to the second embodiment of the disclosure. Here, the classification method 200 is applicable to the classification device 10, but the disclosure is not limited thereto. The classification method 200 can set up decision threshold corresponding to different defect classes of the product. As such, the classification method 200 can improve the classification for a defect class that will significantly affect the quality, thereby reducing the total of samples to be re-examined in that defect class. The following description refers to FIG. 2A and FIG. 2B.

In a step S210, the neural network 131 may generate one or more score vectors corresponding to one or more samples respectively. Specifically, the neural network 131 may be used to process a total sample set U composed of N samples, where N is an arbitrary positive integer. The neural network 131 may generate N score vectors S1, S2 . . . . , and SN corresponding to the N samples respectively. Each element in each score vector may correspond to one class. For example, each element in the score vector SN may correspond to one defect class. In this disclosure, it is assumed that each sample may have K classes of defects. Said K classes may be Class 1, Class 2, . . . , and Class K, where K is an arbitrary positive integer. Therefore, a dimension of the score vector (i.e., the score vectors S1, S2, . . . , and SN) of each sample may be K×1. In the industry for manufacturing wafers or printed circuit boards, the samples may be, for example, visual image data of wafer obtained by an automated optical inspection equipment (AOI Equipment) or visual image data of printed circuit board obtained by an automated visual inspection equipment (AVI Equipment), but the disclosure is not limited thereto.

In a step S230, the classifier 135 may determine a first subset of the one or more samples according to the one or more score vectors and a first decision threshold, wherein the first subset is associated with a first class. Specifically, it is assumed that the first class in this embodiment is Class 1. If a defect of Class 1 has significant adverse effects to the product and the classification device 10 intends to improve the classification for Class 1 (e.g., improve an accuracy or a precision rate of the classification for Class 1), the classifier 135 may determine the first subset of the total sample set U according to the score vectors S1, S2, . . . , and SN and the first decision threshold corresponding to Class 1. In this embodiment, the first subset may be, for example, a subset B1 depicted in FIG. 2B, in which a sample set I1 of the samples to be re-examined is a complement of the subset B1 in the total sample set U, as shown by Equation (1). It should be noted that, in the step S230, the classifier 135 can determine the first subset of the one or more samples simply by performing one-time inference.

$$I1 = U - B1 \quad \text{Equation (1)}$$

The first decision threshold may be configured to make samples in the first subset satisfy a first requirement, and the first decision threshold may be, for example, a confidence threshold or a likelihood ratio threshold associated with the accuracy or the precision rate. Further, the first decision threshold may be configured in advance (e.g., by using a validation dataset). Specifically, the first decision threshold may be configured to make the samples in the subset B1 satisfy the requirement on the accuracy or the precision rate of the classification for Class 1. For example, the first decision threshold may be configured to make the subset B1 satisfy the requirement on the precision rate of the samples of Class 1 to be 99.95% or more. The first decision threshold may be configured by the user as needed, and the disclosure does not limit the first decision threshold only to be the precision rate of 99.95% or more. Since the samples in the subset B1 already satisfy the first requirement, these samples do not need to go through human inspection.

In a step S250, the computation module 137 may select samples to be re-examined from the one or more samples according to the first subset. Specifically, the computation module 137 may select the sample set I1 of the samples to be re-examined from the total sample set U according to the subset B1.

In certain embodiments, the method 200 may further include a step S235. In the step S235, the classifier 135 may determine a second subset of the one or more samples according to the one or more score vectors and a second decision threshold, wherein the second subset is associated with a second class. Specifically, it is assumed that the classification device 10 also intends to improve the classification for Class i in addition to Class 1, the classifier 135 may determine a second subset Bi (i may be 2, 3, . . . , and/or K) of the total sample set U according to the score vectors S1, S2, . . . , and SN and the second decision threshold corresponding to Class i. In this embodiment, the second subset may be subsets B2, . . . , and/or BK depicted in FIG. 2B, It should be noted that, in the step S235, the classifier 135 can determine the second subset of the one or more samples simply by performing one-time inference.

The second decision threshold may be configured to make samples in the second subset satisfy a second requirement, and the second decision threshold may be, for example, a confidence threshold or a likelihood ratio threshold associated with the accuracy or the precision rate. Further, the second decision threshold may be configured in advance (e.g., by using a validation dataset). Specifically, the second decision threshold may be configured to make the samples in the subset Bi satisfy the requirement on the accuracy or the precision rate of the classification for Class i. For example, the second decision threshold may be configured to make the precision rate of the samples classified as Class K in the subset BK to be 99.95% or more. It should be noted that, the first decision threshold may be identical to or different from the second decision threshold. For example, in certain embodiments, the first decision threshold may be configured to make the precision rate of the samples classified as Class 1 in the subset B1 to be 99.95% or more, and the second decision threshold may be configured to make the precision rate of the samples classified as Class K in the subset BK to be 80% or more. Since the samples in the subset BK already satisfy the second requirement, these samples do not need to go through human inspection.

In an embodiment, if the method 200 includes the step S235, the computation module 137 may select the samples to be re-examined from the one or more samples according to the first subset and the second subset in the step S250. Here, the samples to be re-examined are included in a complement of a union of the first subset and the second subset in the one or more samples. Specifically, the computation module 137 may select the sample set I1 of the samples to be re-examined from the total sample set U according to the subsets B1, B2, . . . , and BK. Here, the sample set I1 of the samples to be re-examined is a complement of a union of the subsets B1, B2, . . . , and BK in the total sample set U, as shown by Equation (2).

$$I1 = U - U_{i=1}^{K} Bi \quad \text{Equation (2)}$$

The method 200 may be used to recognize an industrial visual dataset. The industrial visual data may be, for example, a wafer-related defect dataset shown by Table 1. Classes of the defects may include, but not limited to, seven classes of defects including Probe Mark Shift, Overkill, Ugly Die, Process Defect, Particle, Foreign Material and Pad Discolor, which may be represented by Class 1, Class 2, Class 3, Class 4, Class 5, Class 6 and Class 7, respectively.

TABLE 1

|  | Training set | Validation set | Testing set | Total |
| --- | --- | --- | --- | --- |
| Probe Mark Shift | 5265 | 1755 | 1755 | 8775 |
| Overkill | 2775 | 925 | 925 | 4625 |
| Ugly Die | 4294 | 1432 | 1432 | 7158 |
| Process Defect | 1752 | 584 | 584 | 2920 |
| Particle | 4835 | 1611 | 1611 | 8057 |
| Foreign Material | 1235 | 412 | 412 | 2059 |
| Pad Discolor | 778 | 259 | 259 | 1296 |
| Sum-up | 20934 | 6978 | 6978 | 34890 |

It is assumed that the user requirement is that an overall accuracy of the defect classification needs to reach 99.95%. However, the neural network used is unable to satisfy such requirement (e.g., the accuracy of the classifier used by Table 1 does not reach 99.95% but falls between 98% and 99.95%). In this case, the method 200 of the disclosure may be used to make partial samples in the classification satisfy the accuracy of 99.9% for a specific defect class so that the partial samples do not need to go through human inspection.

With Validation set of Table 1 as an example, Table 2 shows a per-class precision rate achievable by using K-fold Cross-validation and the method 200 to adjust Validation set of Table 1. Here, K is 5 (i.e., 5 subsets are generated according to Validation set of Table 1 and represented by Subset #1, Subset #2, Subset #3, Subset #4 and Subset #5, respectively). Also, "Rate of samples not requiring human inspection" represents a rate of the samples that satisfy the requirement of the accuracy among a total of samples. As can be seen from Table 2, the disclosure can make the rate of the samples that satisfy the requirement of the accuracy among Class 1 to Class 7 to reach approximately 85.14%. In other words, although the accuracy of the classifier used does not reach 99.95%, the disclosure can still maximize the rate of the samples that satisfy the requirement on the accuracy such that there are up to 85.14% of the samples satisfying the requirement of the accuracy of 99.95%. Accordingly, 85.14% of the samples do not need to go through human inspection.

TABLE 2

|  |  | #1 | #2 | #3 | #4 | #5 |
| --- | --- | --- | --- | --- | --- | --- |
| Class 1 | Total of samples | 1754 | 1736 | 1768 | 1711 | 1704 |
|  | Rate of samples not requiring human inspection (%) | 99.04 | 98.02 | 99.55 | 98.84 | 98.78 |
| Class 2 | Total of samples | 896 | 865 | 847 | 535 | 897 |
|  | Rate of samples not requiring human inspection (%) | 95.52 | 94.639 | 92.47 | 57.16 | 97.39 |
| Class 3 | Total of samples | 1019 | 1294 | 1304 | 1334 | 1122 |
|  | Rate of samples not requiring human inspection (%) | 72.53 | 92.03 | 89.38 | 91.62 | 78.35 |
| Class 4 | Total of samples | 284 | 336 | 498 | 442 | 312 |
|  | Rate of samples not requiring human inspection (%) | 46.63 | 57.63 | 85.71 | 76.74 | 54.64 |
| Class 5 | Total of samples | 1108 | 1380 | 1277 | 1345 | 1512 |
|  | Rate of samples not requiring human inspection (%) | 69.00 | 86.41 | 80.21 | 83.13 | 91.64 |
| Class 6 | Total of samples | 152 | 186 | 261 | 269 | 305 |
|  | Rate of samples not requiring human inspection (%) | 38.48 | 41.52 | 65.91 | 65.13 | 74.94 |

TABLE 2-continued

|  |  | #1 | #2 | #3 | #4 | #5 |
|---|---|---|---|---|---|---|
| Class 7 | Total of samples | 259 | 256 | 258 | 209 | 268 |
|  | Rate of samples not requiring human inspection (%) | 100.0 | 98.84 | 100.0 | 84.27 | 100.0 |
| | Total of samples overall | 5472 | 6053 | 6213 | 5845 | 6121 |
| | Overall weighted average rate of samples not requiring human inspection (%) | 78.42 | 86.74 | 89.04 | 83.76 | 87.72 |

Cross-validation overall average rate of samples not requiring human inspection (%): 85.14

With Testing set of Table 1 as an example, Table 3 shows a per-class precision rate achievable by using K-fold Cross-validation and the method 200 to adjust Testing set of Table 1. Here, K is 5 (i.e., 5 subsets are generated according to Testing set of Table 1 and represented by Subset #1, Subset #2, Subset #3, Subset #4, Subset #5, respectively). As can be seen from Table 3, although the precision rate of the classifier used does not reach 99.95%, the disclosure can still maximize the rate of the samples that satisfy the requirement on the accuracy such that there are up to 84.82% of the samples satisfying the requirement of the precision rate of 99.95%. Accordingly, 84.82% of the samples do not need to go through human inspection.

TABLE 3

|  |  | #1 | #2 | #3 | #4 | #5 |
|---|---|---|---|---|---|---|
| Class 1 | Total of samples | 1754 | 1725 | 1762 | 1764 | 1697 |
|  | Rate of samples not requiring human inspection (%) | 98.81 | 100.00 | 99.49 | 99.32 | 98.04 |
| Class 2 | Total of samples | 706 | 898 | 838 | 519 | 914 |
|  | Rate of samples not requiring human inspection (%) | 76.66 | 95.7356 | 91.68 | 56.66 | 97.65 |
| Class 3 | Total of samples | 1021 | 1301 | 1271 | 1325 | 1145 |
|  | Rate of samples not requiring human inspection (%) | 71.30 | 92.60 | 90.40 | 90.82 | 78.64 |
| Class 4 | Total of samples | 352 | 355 | 479 | 469 | 299 |
|  | Rate of samples not requiring human inspection (%) | 61.65 | 58.29 | 82.16 | 80.72 | 51.91 |
| Class 5 | Total of samples | 1134 | 1382 | 1284 | 1347 | 1470 |
|  | Rate of samples not requiring human inspection (%) | 68.73 | 86.38 | 80.40 | 84.61 | 90.85 |
| Class 6 | Total of samples | 157 | 186 | 280 | 194 | 288 |
|  | Rate of samples not requiring human inspection (%) | 38.57 | 47.09 | 62.50 | 48.99 | 69.73 |
| Class 7 | Total of samples | 259 | 258 | 258 | 246 | 255 |
|  | Rate of samples not requiring human inspection (%) | 100.00 | 99.61 | 100.00 | 99.19 | 100.00 |
| | Total of samples overall | 5383 | 6108 | 6172 | 5864 | 6068 |
| | Overall weighted average rate of samples not requiring human inspection (%) | 77.14 | 87.53 | 88.45 | 84.04 | 86.96 |

Cross-validation overall average rate of samples not requiring human inspection (%): 84.82

Figure 3A:
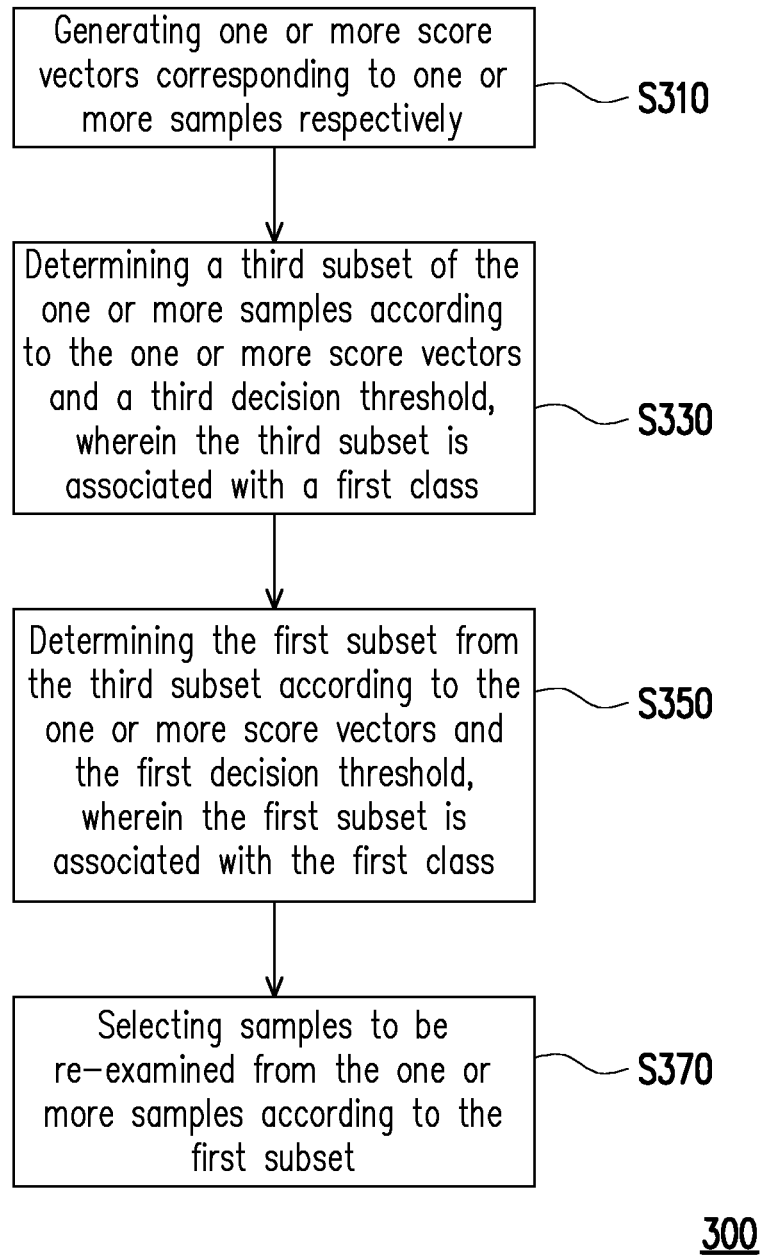
FIG. 3A is a flowchart illustrating a neural-network-based classification method according to a third embodiment of the disclosure.
Figure 3B:
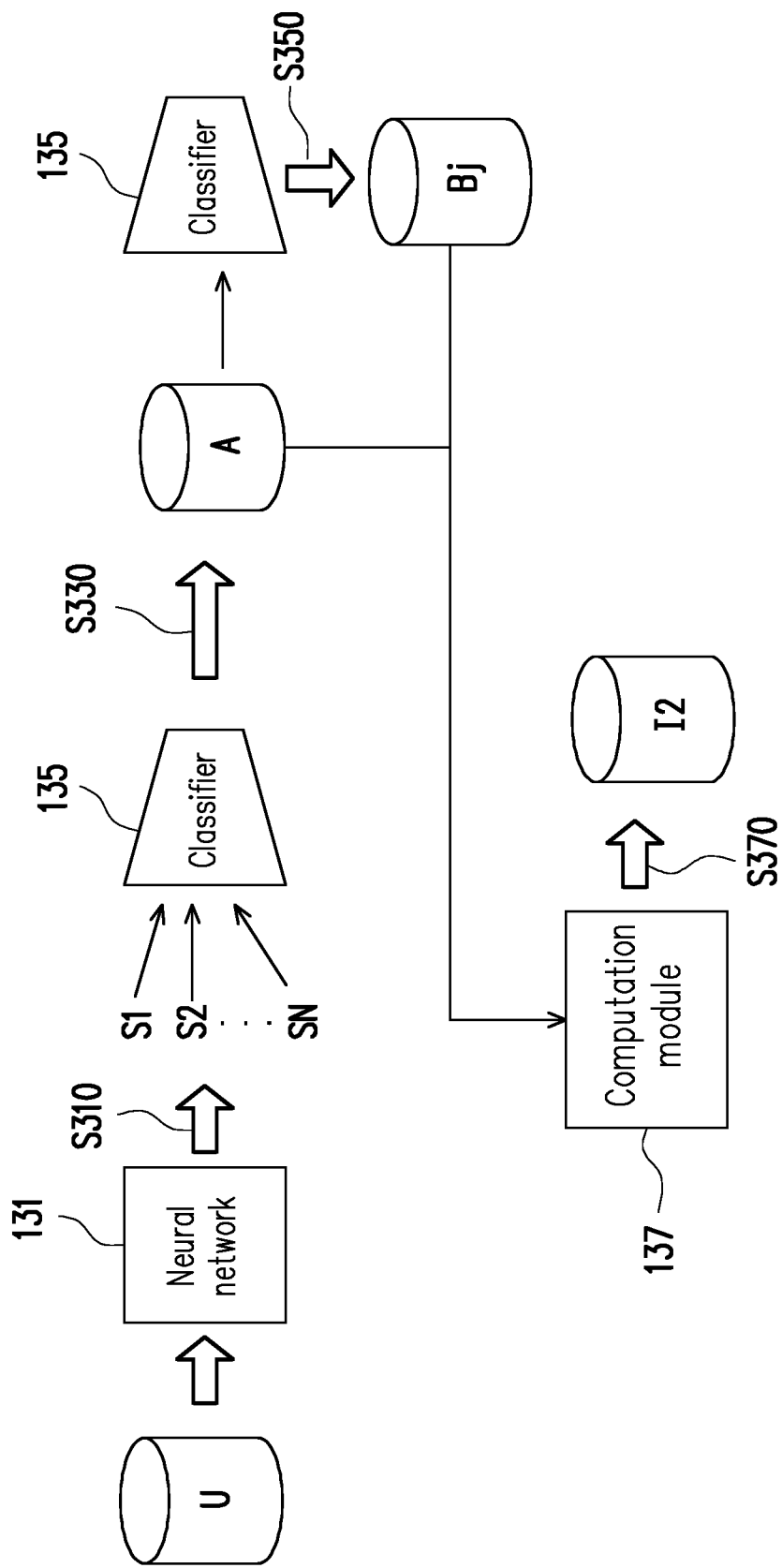
FIG. 3B is a schematic diagram illustrating flows in the neural-network-based classification method according to the third embodiment of the disclosure.

FIG. 3A is a flowchart illustrating a neural-network-based classification method 300 according to the third embodiment of the disclosure, and FIG. 3B is a schematic diagram illustrating flows in the neural-network-based classification method 300 according to the third embodiment of the disclosure. Here, the classification method 300 is applicable to the classification device 10, but the disclosure is not limited thereto. While maintaining the precision rate (or the accuracy) of the classification for the specific defect class, the method 300 may maximize a recall rate for the specific defect class (that is, equivalent to minimizing a miss rate for the specific defect class). The following description refers to FIG. 3A and FIG. 3B.

In a step S310, the neural network 131 may generate one or more score vectors corresponding to one or more samples respectively. Specifically, similar to the step S210, the neural network 131 may generate N score vectors S1, S2, . . . , and SN corresponding N samples, and each score vector may include one or more elements. Here, each of the one or more elements corresponds to one class.

In a step S330, the classifier 135 may determine a third subset of the one or more samples according to the one or more score vectors and a third decision threshold, wherein the third subset is associated with a first class. Specifically, it is assumed that the first class in this embodiment is Class j. If a defect of Class j has significant adverse effects to the product and the classification device 10 intends to improve the classification for Class j (e.g., improve the recall rate or the miss rate of the classification for Class j), the classifier 135 may determine the third subset of the total sample set U according to the score vectors S1, S2, . . . , and SN and the third decision threshold corresponding to Class j. In this embodiment, the third subset may be, for example, a subset A depicted in FIG. 3B.

The third decision threshold may be configured to make samples in the third subset satisfy a third requirement of call rate, and the third decision threshold may be, for example, a confidence threshold or a likelihood ratio threshold associated with the recall rate and the miss rate. Further, the third decision threshold may be configured in advance (e.g., by using a validation dataset). Specifically, the third decision threshold may be configured to make the samples in the subset A satisfy the requirements on the recall rate and the miss rate of the classification for Class j. For example, the third decision threshold may be configured to make the subset A satisfy the requirement on the recall rate of the samples of Class j to be 99.95% or more. The third decision threshold may be configured by the user as needed, and the disclosure does not limit the third decision threshold only to be the recall rate of 99.95% or more.

In a step S350, the classifier 135 may determine the first subset from the third score vector according to the one or more score vectors and the first decision threshold, wherein the first subset is associated with the first class. Specifically, the classifier 135 may determine the first subset of the total sample set U according to the score vectors S1, S2, . . . , and SN and the first decision threshold corresponding to Class j. In this embodiment, the first subset may be, for example, a subset Bj depicted in FIG. 3B. It should be noted that, the step S330 and the step S350 may be executed by different classifiers, and the disclosure does not limit said two steps only to be executed by using one single classifier 135. On the other hand, in the step S350, the classifier 135 can determine the first subset of the one or more samples simply by performing one-time inference.

The first decision threshold may be configured to make samples in the first subset satisfy a first requirement, and the first decision threshold may be, for example, a confidence threshold or a likelihood ratio threshold associated with the accuracy or the precision rate. Further, the first decision threshold may be configured in advance (e.g., by using a validation dataset). Specifically, the first decision threshold may be configured to make the samples in the subset Bj satisfy the requirement on the accuracy or the precision rate of the classification for Class j. For example, the first decision threshold may be configured to make the subset Bj satisfy the requirement on the precision rate of the samples of Class j to be 99.95% or more. The first decision threshold may be configured by the user as needed, and the disclosure does not limit the first decision threshold only to be the precision rate of 99.95% or more. Since the samples in the subset Bj already satisfy the first requirement, these samples do not need to through human inspection.

In a step S370, the computation module 137 may select samples to be re-examined from the one or more samples according to the first subset, wherein the samples to be re-examined are included in a complement of the first subset in the third subset. Specifically, the computation module 137 may select a sample set I2 of the samples to be re-examined according to the subset Bj and the subset A. Here, the sample set I2 of the samples to be re-examined is a complement of the sample set Bj in the sample set A, as shown by Equation (3). The method 300 may be used to recognize an industrial visual dataset, but the disclosure is not limited thereto.

$$I2 = A - Bj \qquad \text{Equation (3)}$$

Figure 4A:
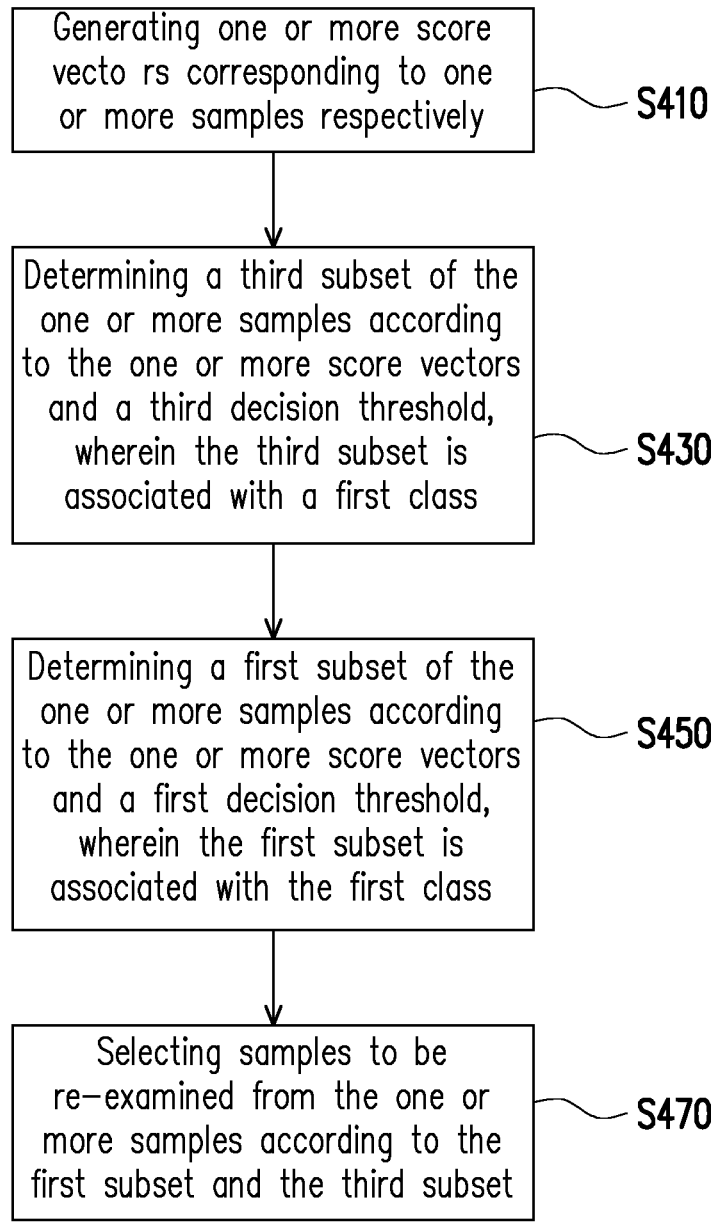
FIG. 4A is a flowchart illustrating a neural-network-based classification method according to a fourth embodiment of the disclosure.
Figure 4B:
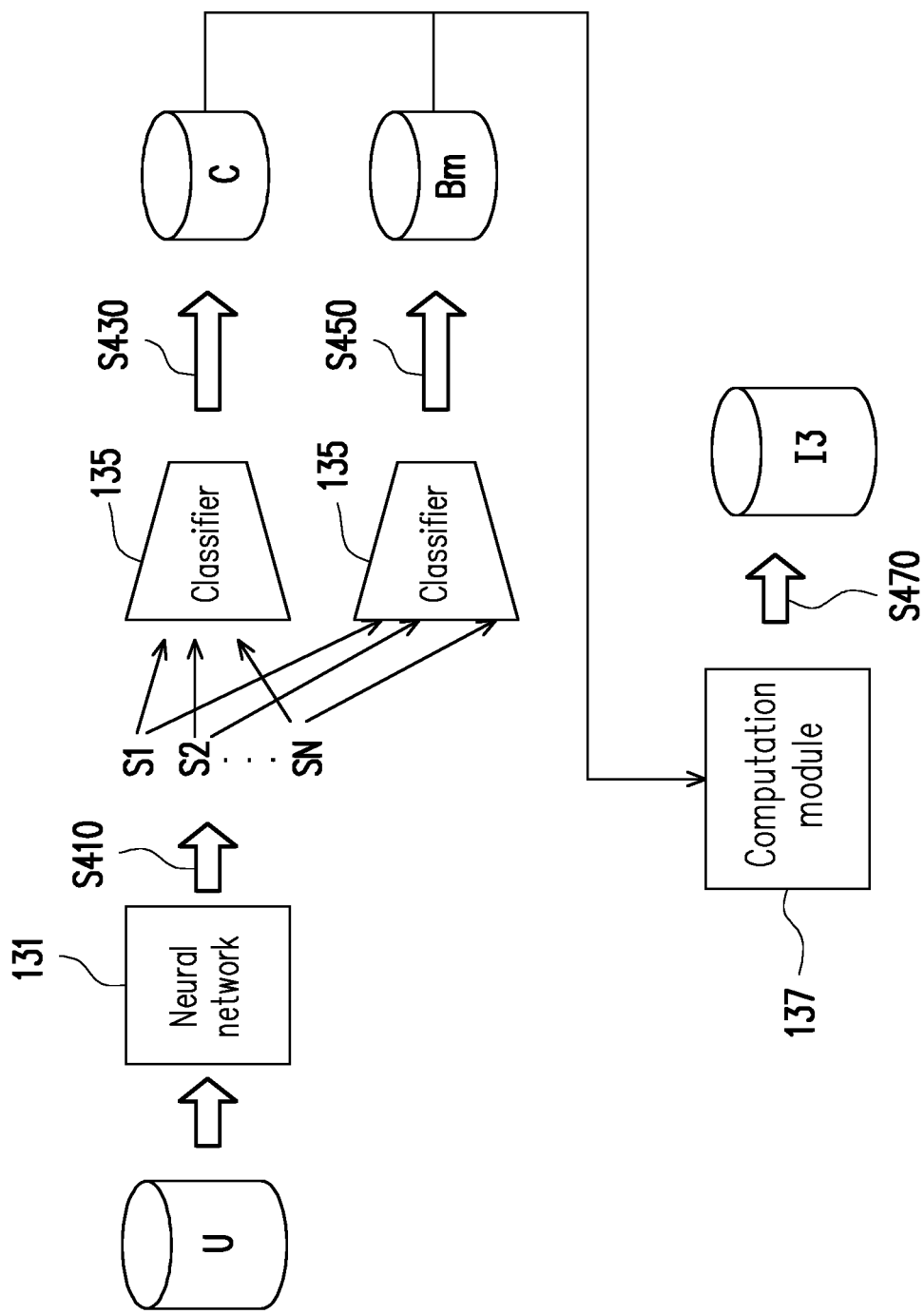
FIG. 4B is a schematic diagram illustrating flows in the neural-network-based classification method according to the fourth embodiment of the disclosure.

FIG. 4A is a flowchart illustrating a neural-network-based classification method 400 according to the fourth embodiment of the disclosure, and FIG. 4B is a schematic diagram illustrating flows in the neural-network-based classification method 400 according to the fourth embodiment of the disclosure. Here, the classification method 400 is applicable to the classification device 10, but the disclosure is not limited thereto. While maintaining the precision rate (or the accuracy) of the classification for the specific defect class, the method 400 may maximize a recall rate for the specific defect class (equivalent to minimizing a miss rate for the specific defect class). The following description refers to FIG. 4A and FIG. 4B.

In a step S410, the neural network 131 may generate one or more score vectors corresponding to one or more samples respectively. Specifically, similar to the step S210, the neural network 131 may generate N score vectors S1, S2, . . . , and SN corresponding N samples, and each score vector may include one or more elements. Here, each of the one or more elements corresponds to one class.

In a step S430, the classifier 135 may determine a third subset of the one or more samples according to the one or more score vectors and a third decision threshold, wherein the third subset is associated with a first class. Specifically, it is assumed that the first class is Class m in this embodiment, the classifier 135 may determine the third subset of the total sample set U according to the score vectors S1, S2, . . . , and SN and the third decision threshold corresponding to Class m. In this embodiment, the third subset may be, for example, a subset C depicted in FIG. 4B.

The third decision threshold may be configured to make samples in the third subset satisfy a third requirement of recall rate, and the third decision threshold may be, for example, a confidence threshold or a likelihood ratio threshold associated with the recall rate and the miss rate. Further, the third decision threshold may be configured in advance (e.g., by using a validation dataset). Specifically, the third decision threshold may be configured to make samples in the subset C satisfy requirements on the recall rate and the miss rate of the classification for Class m. For example, the third decision threshold may be configured to make the subset C satisfy the requirement on the recall rate of the samples of Class m to be 99.95% or more. The third decision threshold may be configured by the user as needed, and the disclosure does not limit the third decision threshold only to be the recall rate of 99.95% or more.

In a step S450, the classifier 135 may determine a first subset of the one or more samples according to the one or more score vectors and a first decision threshold, wherein the first subset is associated with the first class. Specifically, it is assumed that the first class is Class m in this embodiment, the classifier 135 may determine the first subset of the total sample set U according to the score vectors S1, S2, . . . , and SN and the first decision threshold corresponding to Class m. In this embodiment, the first subset may be, for example, a subset Bm depicted in FIG. 4B. It should be noted that, the disclosure does not limit an executing order of the step S430 and the step S450. On the other hand, in the step S450, the classifier 135 can determine the first subset of the one or more samples simply by performing one-time inference.

The first decision threshold may be configured to make samples in the first subset satisfy a first requirement, and the first decision threshold may be, for example, a confidence threshold or a likelihood ratio threshold associated with the accuracy or the precision rate. Further, the first decision threshold may be configured in advance (e.g., by using a validation dataset). Specifically, the first decision threshold may be configured to make samples in the subset Bm satisfy requirements on the accuracy and the precision rate of the classification for Class m. For example, the first decision threshold may be configured to make the subset Bm satisfy the requirement on the precision rate of the samples of Class m to be 99.95% or more. The first decision threshold may be configured by the user as needed, and the disclosure does not limit the first decision threshold only to be the precision rate of 99.95% or more. Since the samples in the subset Bm already satisfy the first requirement, these samples do not need to go through human inspection.

In a step S470, the computation module 137 may select samples to be re-examined from the one or more samples according to the first subset and the third subset, wherein the samples to be re-examined are included in a complement of the first subset in the third subset. Specifically, the computation module 137 may select a sample set I3 of the samples to be re-examined according to the subset Bm and the subset C. Here, the sample set I3 of the samples to be re-examined is a complement of the sample set Bm in the sample set C, as shown by Equation (4). The method 400 may be used to recognize an industrial visual dataset, but the disclosure is not limited thereto.

$$I3 = C - Bm \quad \text{Equation (4)}$$

The method 400 may be used to recognize an industrial visual dataset. The industrial visual dataset may be, for example, a PCB-related defect dataset "XDS_5_Sets_790K-R1" as shown by Table 4. Said dataset includes samples with defects (represented by Class a) and samples without defects (represented by Class b).

TABLE 4

| XDS_5_Sets_790K-R1 | | | | |
|---|---|---|---|---|
| | Training set | Validation set | Testing set | Total |
| Class a | 55930 | 13870 | 27772 | 97572 |
| Class b | 215659 | 33910 | 67788 | 317357 |
| Total | 271589 | 47780 | 95560 | 414929 |
| Class b/Class a | 3.86 | 2.44 | 2.44 | 3.25 |

It is assumed that the user requirement is that the recall rate of Class a reaches 99.95% or more (i.e., a false negative rate (FNR) reaches 0.05% or less) and a true negative rate (TNR) reaches 50% or more. With Validation set of Table 4 as an example, Table 5 shows that a likelihood ratio test (LRT) and the method 400 are used to adjust Validation set of Table 4 to make the recall rate of Class a reach 99.95% or more. Table 6 shows that a probability threshold and the method 400 are used to adjust Validation set of Table 4 to make the precision rate of Class a reach 99.95% or more. As can be seen from Table 5 and Table 6, the method 400 can significantly reduce the total of samples requiring human inspection.

TABLE 5

| Overall accuracy (%) | Overall error (%) | XDS_5_Sets_790K-R1 (Neural network model used: DFB-Net) Prediction results of Neural network | | | | | |
|---|---|---|---|---|---|---|---|
| 66.72 | 33.28 | Class a | Class b | FNR/TNR (1%) | Rate of samples not requiring human inspection (%) | Total of samples not requiring human inspection | Total of samples |
| Ground truth | Class a | 13864 | 6 | 0.0433 | 37.71 | 18020 | 13870 |
| | Class b | 15896 | 18014 | 53.12 | | | 33910 |
| | Sum-up | 29760 | 18020 | LRT threshold: 0.0026 | | | 47780 |

TABLE 6

| Overall accuracy (%) | Overall error (%) | XDS_5_Sets_790K-R1 (Neural network model used: DFB-Net) Prediction results of Neural network | | | | | |
|---|---|---|---|---|---|---|---|
| 95.70 | 4.30 | Class a | Class b | FNR/ Precision rate (%) | Rate of samples not requiring human inspection (%) | Total of samples not requiring human inspection | Total of samples |
| Ground truth | Class a | 11819 | 2051 | 14.7873/ 99.96 | 24.75 | 11824 | 13870 |
| | Class b | 5 | 33905 | | | | 33910 |
| | Sum-up | 11824 | 35956 | Probability threshold: 0.9942 | | | 47780 |

With Testing set of Table 4 as an example, Table 7 shows that the likelihood ratio test and the method 400 are used to adjust Validation set of Table 4 to make the recall rate of Class a reach 99.95% or more. Table 8 shows that the probability threshold and the method 400 are used to adjust Testing set of Table 4 to make the precision rate of Class a reach 99.95% or more. As can be seen from Table 7 and Table 8, the method 400 can significantly reduce the total of samples requiring human inspection.

TABLE 7

| Overall accuracy (%) | Overall error (%) | XDS_5_Sets_790K-R1 (Neural network model used: DFB-Net) Prediction results of Neural network | | | | | |
|---|---|---|---|---|---|---|---|
| 66.72 | 33.28 | Class a | Class b | FNR/TNR (1%) | Rate of samples not requiring human inspection (%) | Total of samples not requiring human inspection | Total of samples |
| Ground truth | Class a | 27759 | 13 | 0.0468 | 37.81 | 36128 | 27772 |
|  | Class b | 31673 | 36115 | 53.28 |  |  | 67788 |
|  | Sum-up | 59432 | 36128 | LRT threshold: 0.0026 |  |  | 95560 |

TABLE 8

| Overall accuracy (%) | Overall error (%) | XDS_5_Sets_790K-R1 (Neural network model used: DFB-Net) Prediction results of Neural network | | | | | |
|---|---|---|---|---|---|---|---|
| 95.70 | 4.30 | Class a | Class b | FNR/ Precision rate (%) | Rate of samples not requiring human inspection (%) | Total of samples not requiring human inspection | Total of samples |
| Ground truth | Class a | 23737 | 4035 | 14.529/99.95 | 24.85 | 23750 | 27772 |
|  | Class b | 13 | 67775 |  |  |  | 67788 |
|  | Sum-up | 23750 | 71810 | Probability threshold: 0.9942 |  |  | 95560 |

The method 400 can significantly reduce the total of samples requiring human inspection. For instance, as detected by the automated visual inspection (AVI) equipment, there are 100 points of defects on both sides of one particular PCB, in which 20 points are true defects and 80 points are false defects. After a recognition system based on a neural network (which may be a neural network of a conventional class) is introduced, as detected by the neural network, there are 60 points of defects on both sides of that particular PCB, in which 20 points are true defects and 40 points are false defects. As a result, compared to the PCB inspection using only the AVI, introduction of the recognition system based on the neural network can reduce the total of samples requiring human inspection by approximately 40%. On the other hand, after the method 400 of the disclosure is introduced, the classification device 10 can detect that there are 40 points of defects on both sides of that particular PCB, in which 17 points are true defects and 23 points are false defects. In other words, compared to the PCB inspection using only the AVI, introduction of the method 400 of the disclosure can reduce the total of samples requiring human inspection by approximately 60%.

The method 400 may also be used to the wafer-related defect dataset shown by Table 1. It is assumed that the user requirement is that an overall accuracy of the defect classification needs to reach 99.95%. However, the neural network used is unable to satisfy such requirement. In this case, the method 400 of the disclosure can be used to reduce the samples to be re-examined for the specific defect class.

With Validation set of Probe Mark Shift of Table 1 as an example, FIG. 5A shows that the likelihood ratio test and the method 400 are used to adjust Validation set of Probe Mark Shift of Table 1 (the defect of Class 1) to make the recall rate of the samples of Probe Mark Shift reach 99.95% or more. FIG. 5B shows that the probability threshold and the method 400 are used to adjust Validation set of Probe Mark Shift of Table 1 to make the precision rate of the samples of Probe Mark Shift reach 99.95% or more. As can be seen from FIGS. 5A and 5B, the method 400 can significantly reduce the total of samples requiring human inspection.

With Testing set of Probe Mark Shift of Table 1 as an example, FIG. 5C shows that the likelihood ratio test and the method 400 are used to adjust Testing set of Probe Mark Shift of Table 1 to make the recall rate of the samples of Probe Mark Shift reach 99.95% or more. FIG. 5D shows that the probability threshold and the method 400 are used to adjust Testing set of Probe Mark Shift of Table 1 to make the precision rate of the samples of Probe Mark Shift reach 99.95% or more. As can be seen from FIGS. 5C and 5D, the method 400 can significantly reduce the total of samples requiring human inspection.

With Validation set of Overkill of Table 1 as an example, FIG. 6A shows that the likelihood ratio test and the method 400 are used to adjust Validation set of Overkill of Table 1 (the defect of Class 2) to make the recall rate of the samples of Overkill reach 99.95% or more. FIG. 6B shows that the probability threshold and the method 400 are used to adjust Validation set of Overkill of Table 1 to make the precision rate of the samples of Overkill reach 99.95% or more. As can be seen from FIGS. 6A and 6B, the method 400 can significantly reduce the total of samples requiring human inspection.

With Testing set of Overkill of Table 1 as an example, FIG. 6C shows that the likelihood ratio test and the method 400 are used to adjust Validation set of Overkill of Table 1 to make the recall rate of the samples of Overkill reach 99.95% or more. FIG. 6D shows that the probability threshold and the method 400 are used to adjust Testing set of Overkill of Table 1 to make the precision rate of the samples of Overkill reach 99.95% or more. As can be seen from FIGS. 6C and 6D, the method 400 can significantly reduce the total of samples requiring human inspection.

In summary, the disclosure can effectively reduce the total of samples to be re-examined. For products with multiple types of defects, if the existing neural network is unable to achieve the required overall accuracy of the classification, the disclosure can improve the per-class precision rate for the specific defect class based on priority considerations. In this way, a proportion of data that can be automatically read may be maximized, thereby reducing human inspection cost required by the remaining data. In other words, the disclosure can significantly reduce the human resource expenditure, and can effectively prevent products with critical defect from entering the market.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A neural-network-based classification device, comprising:
   a storage medium, storing a plurality of modules; and
   a processor, coupled to the storage medium, the processor accessing and executing the plurality of modules, the plurality of modules comprising:
      a neural network, generating one or more score vectors corresponding to one or more samples respectively;
      a classifier, determining a first subset of the one or more samples according to the one or more score vectors and a first decision threshold, and determining a second subset of the one or more samples according to the one or more score vectors and a second decision threshold, wherein the first subset and the second subset are associated with a first class, wherein the second decision threshold is associated with at least one of a recall rate and a miss rate; and
      a computation module, selecting samples to be re-examined from the one or more samples according to the first subset and the second subset.

2. The neural-network-based classification device according to claim 1, wherein
   the first decision threshold is configured to make samples in the first subset satisfy a first requirement; and
   the second decision threshold is configured to make samples in the second subset satisfy a second requirement.

3. The neural-network-based classification device according to claim 1, wherein the first decision threshold is associated with at least one of an accuracy and a precision rate.

4. The neural-network-based classification device according to claim 1, wherein the classifier is configured to execute:
   determining the first subset from the second subset according to the one or more score vectors and the first decision threshold.

5. The neural-network-based classification device according to claim 4, wherein the second decision threshold is configured to make samples in the second subset satisfy a second requirement.

6. The neural-network-based classification device according to claim 4, wherein the samples to be re-examined are included in a complement of the first subset in the second subset.

7. The neural-network-based classification device according to claim 1, wherein the second decision threshold is configured to make samples in the second subset satisfy a second requirement.

8. The neural-network-based classification device according to claim 1, wherein the samples to be re-examined are included in a complement of the first subset in the second subset.

9. A neural-network-based classification method, comprising:
   generating, by a neural network, one or more score vectors corresponding to one or more samples respectively;
   determining a first subset of the one or more samples according to the one or more score vectors and a first decision threshold, and determining a second subset of the one or more samples according to the one or more score vectors and a second decision threshold, wherein the first subset and the second subset are associated with a first class, wherein the second decision threshold is associated with at least one of a recall rate and a miss rate; and
   selecting samples to be re-examined from the one or more samples according to the first subset and the second subset.

10. The neural-network-based classification method according to claim 9, wherein
    the first decision threshold is configured to make samples in the first subset satisfy a first requirement; and
    the second decision threshold is configured to make samples in the second subset satisfy a second requirement.

11. The neural-network-based classification method according to claim 6, wherein the first decision threshold is associated with at least one of an accuracy and a precision rate.

12. The neural-network-based classification method according to claim 9, wherein the step of determining the first subset of the one or more samples according to a first element of the one or more score vectors and the first decision threshold comprises:
    determining the first subset from the second subset according to the one or more score vectors and the first decision threshold.

13. The neural-network-based classification method according to claim 12, wherein the second decision threshold is configured to make samples in the second subset satisfy a second requirement.

14. The neural-network-based classification method according to claim 12, wherein the samples to be re-examined are included in a complement of the first subset in the second subset.

15. The neural-network-based classification method according to claim 9, wherein the third-second decision threshold is configured to make samples in the third-second subset satisfy a third second requirement.

16. The neural-network-based classification method according to claim 9, wherein the samples to be re-examined are included in a complement of the first subset in the second subset.

\* \* \* \* \*